United States Patent
Nakamura et al.

(10) Patent No.: US 6,636,549 B1
(45) Date of Patent: *Oct. 21, 2003

(54) METHOD FOR CALCULATING PHASE SHIFT COEFFICIENTS OF AN M SEQUENCE

(75) Inventors: Takaharu Nakamura, Kanagawa (JP); Kazuo Kawabata, Kanagawa (JP); Kazuhisa Ohbuchi, Kanagawa (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/154,496

(22) Filed: Sep. 16, 1998

(30) Foreign Application Priority Data

Mar. 18, 1998 (JP) .............................. 10-068226

(51) Int. Cl.$^7$ ................................. H04B 1/69
(52) U.S. Cl. ....................... 375/130; 370/479
(58) Field of Search ................. 375/130, 139, 375/140, 279, 273, 308, 323, 329; 370/320, 335, 342, 441; 327/164; 708/250, 252, 253

(56) References Cited

U.S. PATENT DOCUMENTS

| | | | | |
|---|---|---|---|---|
| 5,991,333 A | * | 11/1999 | Rice | 370/479 |
| 6,038,577 A | * | 3/2000 | Burshtein | 708/252 |
| 6,404,828 B2 | * | 6/2002 | Kaewell, Jr. | 375/341 |
| 6,430,246 B1 | * | 8/2002 | Burshtein | 708/252 |

* cited by examiner

*Primary Examiner*—Chi Pham
*Assistant Examiner*—Emmanuel Bayard
(74) *Attorney, Agent, or Firm*—Katten Muchin Zavis Rosenman

(57) ABSTRACT

An n-bit binary value corresponding to an amount of phase shift d is assigned to an SREG, and a shift operation is performed. An n-bit vector value corresponding to a decimal value "1" is assigned to an LAT as an initial value. Thereafter, the input from an SW is sequentially stored. An MUL performs a square operation within a Galois field GF ($2^n$) for the output of the LAT. A DBL performs a double operation within the Galois field GF ($2^n$) for the output of the MUL. The SW selects either of the outputs of the MUL and the DBL according to the output value from the MSB side of the SREG. After the shift operation and the latch operation are performed a number of times n, the n-bit output of the LAT is output as respective phase shift coefficients $b_0$ through $b_{n-1}$.

6 Claims, 15 Drawing Sheets

| POWER OF α | VECTOR REPRESENTATION |
|---|---|
| $\alpha^0$ | LSB 1000 MSB |
| $\alpha^1$ | 0100 |
| $\alpha^2$ | 0010 |
| $\alpha^3$ | 0001 |
| $\alpha^4$ | 1100 |
| $\alpha^5$ | 0110 |
| $\alpha^6$ | 0011 |
| $\alpha^7$ | 1101 |
| $\alpha^8$ | 1010 |
| $\alpha^9$ | 0101 |
| $\alpha^{10}$ | 1110 |
| $\alpha^{11}$ | 0111 |
| $\alpha^{12}$ | 1111 |
| $\alpha^{13}$ | 1011 |
| $\alpha^{14}$ | 1001 |

FIG. 8

```
                                    A   C   E
                        OPERATION  II  II  II
                                    ↓   ↓   ↓
6 = (MSB) 0 1 1 0 (LSB)         (MSB) 0 → 1 → 1 → 0 (LSB)
                                        ↑   ↑
                                OPERATION I   I
                                          B   D
```

(a) BINARY REPRESENTATION              (b) OPERATION AT EVERY
    OF THE AMOUNT OF SHIFT                 BINARY POSITION (c) OPERATIONAL SEQUENCE AND ACTUAL OPERATION RESULTS

| OPERATION | OPERATION RESULT |
|---|---|
| INITIAL VALUE SETTING : = | 1 |
| A : OPERATION II : ( )$^2$ = | $1^2$ |
|  = | 1 |
| B : OPERATION I : ( ) × α = | α |
| C : OPERATION II : ( )$^2$ = | $α^2$ |
| D : OPERATION I : ( ) × α = | $α^3$ |
| E : OPERATION II : ( )$^2$ = | $α^6$ |
|  = | $α^2 α^4$ |
|  = | $α^2 (α + 1)$ |
|  = | $α^3 + α^2$ |

$$\therefore α^6 = α^3 + α^2$$

FIG. 9

METHOD FOR CALCULATING PHASE SHIFT COEFFICIENTS OF AN M SEQUENCE

BACKGROUND OF THE INVENTION

1. Field of the Invention

The present invention relates to a method for generating a pseudorandom noise sequence with an arbitrarily designated phase, which is applied to a communication system using a spread-modulation method.

2. Description of the Related Art

In a communications system using spread spectrum modulation, the spectra of many signals can be spread over a broadband, multiplexed, and transmitted by using a Code Division Multiple Access (CDMA). FIG. 1 shows one principle of the configuration of a CDMA communication system.

On a CDMA transmitter 901 side, a spread-modulation unit 905 spread-spectrum modulates the transmission signal which is output from a transmission signal source 903, for example, which is frequency-modulated or phase-modulated by using the spread code generated by a spread code generating unit 904, and the resultant transmission signal is transmitted to a transmission line 906.

On a CDMA receiver 902 side, a despread-demodulation unit 908 must despread (demodulate) a reception signal by using the despread code which has the same sequence and phase as those of the spread code on the transmitter side and which is output from a despread code generating unit 907 in synchronization with the timing of the transmitter side.

Accordingly, the despread code generating unit 907 must have the capability for generating a sequence code having an arbitrary phase according to a timing synchronization signal (normally, this signal is autonomously generated from a reception signal within the CDMA receiver 902).

In a CDMA communication, the spread code (and the despread code) for spreading a spectrum must satisfy the following conditions in addition to the condition that the spread code must be a broadband signal: (1) the number of types of spread codes must be large in order to allow codes to be assigned to many users; (2) a cross-correlation must be small in order to allow the spread code to be identified from a different user code; (3) a self-correlation must be strictly identified in order to ensure the synchronization with the signal addressed to a local station; and (4) the spread code must be as random as possible, have a long cycle, and be difficult to be decoded in order to improve the confidentiality of a communication signal.

Conventionally, a PN (Pseudorandom Noise) sequence is known as the code for satisfying such conditions.

Since the PN sequence can be generated by using a shift register, its generation process is not really random but deterministic. However, the PN sequence is a code having the following properties of randomness. Therefore, this is suitable as the spread code of the CDMA communication, which requires the above described conditions.

Property 1: Balance Property

The numbers of times that "1" and "0" respectively appear in one cycle of the sequence are, different only by 1.

Property 2: Run Property

In the runs of "1s" and runs of "0s" which are included in one cycle, the length of each run is "1" when a classification number of that run is ½, "2" when a classification number of that run is ¼, "3" when a classification number of that run is ⅛, . . . . That is, there is a number of {(classification number of run)×(½ k)} of the runs which have the run number k. Note that, for the runs of which this number is less than 1, these runs become meaningless runs.

Property 3: Correlation Property

If sequences are made cyclic and a comparison is made between the respective code values of the corresponding digits of the two sequences in every state, the number of the digits whose code values match and that of the digits whose code values do not match are different only by 1.

An M sequence (maximum length sequence) is known as a typical PN sequence satisfying such properties. The M sequence is generated using the circuit including an n-stage shift register, which is shown in FIG. 2.

In FIG. 2, the respective outputs of the stages of the n-stage shift register are multiplied with a coefficient $f_i$ (0 or 1), and the multiplication results are fed back to the input side of the shift register via exclusive-OR circuits (+signs encircled in this figure).

If the coefficient $f_i$ satisfies a particular condition when the values of all of the stages of the shift register are not "0" in an initial state, the cycle of the sequence $a_i$ output from the shift register will become the maximum cycle ($2^n-1$) that the n-stage shift register can generate. Such a sequence is referred to as an M sequence.

The circuit shown in FIG. 2 can be represented by the following equation.

$$\sum_{j=0}^{n} f_j a_{i+j} = 0 \tag{1}$$

If $f_n=1$ is assigned to this equation, the following equation can be obtained.

$$a_{i+n} = \sum_{j=0}^{n-1} f_j a_{i+j} \tag{2}$$

The above described equations (1) and (2) are referred to as linear recurring equations. Here, if a delay operator x which satisfies $a_{i+1}=x^j a_i$ is assigned, the equation (2) becomes as follows.

$$\left( \sum_{j=0}^{n} f_j x^j \right) a_i = 0 \tag{3}$$

The polynomial f(x) of the following equation, which is represented by the term on the left side of the above equation (3), is referred to as a characteristic polynomial.

$$f(x) = \sum_{j=0}^{n} f_j x^j \quad (f_0 \neq 0, \; f_n = 1) \tag{4}$$

If the coefficient $f_j$ included in this equation (4) belongs to a Galois field GF (2), and if f(x) is the minimal polynomial possessed by a primitive element α of the Galois field GF ($2^n$), it is known that the circuit shown in FIG. 2, which includes the n-stage shift register, can generate the M sequence having the maximum cycle ($2^n-1$). This minimal polynomial is referred to as a primitive polynomial of degree k. Its details are referred to, for example, in the document "Sensing/Recognition Series Vol. 8, M Sequence and its Application, pp. 16–", written by J. Kashiwagi and published by Shokodo.

The primitive polynomial can be calculated as described on pp. 171 to 191 of this document, and many types of primitive polynomials were previously obtained in some of the papers cited in this document.

For example, the coefficient $f_j$, which is included in the equation (4) and corresponds to a primitive polynomial $f(x)=x^4+x+1$ of the Galois field GF $(2^4)$, becomes $f_0=1$, $f_1=1$, $f_2=f_3=0$, and $f_4=1$. As a result, the M sequence generating circuit shown in FIG. 3 can be configured based on the circuit shown in FIG. 2.

Here, an M sequence $x^d a_i$ whose phase is shifted by d bits from the output $a_i$ of the M sequence will be obtained. If a predetermined initial state of the n-stage (4 stages in FIG. 3) shift register is provided, all of the states of the M sequence, which succeed the initial state, are determined. Therefore, the M sequence having an arbitrary phase is proved to be obtained with the linear combination of the outputs of the respective stages of the shift register, as represented by the following equation (5).

$$x^d a_i = b_0 x^0 a_i + b_1 x^1 a_i + b_2 x^2 a_i + \ldots + b_{n-1} x^{n-1} a_i \quad (5)$$

Consequently, the circuit for generating the M sequence having an arbitrary phase can be configured from the M sequence generating circuit shown in FIG. 3, which includes the 4-stage shift register, as shown in FIG. 4.

In FIG. 4, an initial value is assigned to each of the stages of the 4-stage shift register (SR) 1203 in a PN generator (PNG) 1201. The feedback equivalent to that shown in FIG. 3 is provided by a TAP 1204. TAP information (TAPINFO) 1205, which corresponds to the respective coefficients $b_0$ through $b_3$ included in the equation (5), is provided to 4 AND circuits (ANDs) 1206 in a variable tap (ATAP) 1202. Consequently, the output selected according to the TAPINFO 1205 from among the outputs of the respective stages of the SR 1203 is added to another output by the corresponding AND circuit (AND) 1206 and exclusive-OR circuit (EXOR) 1207, whereby the M sequence $x^d a_i$ having an arbitrary phase d is output as the result of the addition.

The means for providing the initial value to the SR 1203, the means for providing the clock for implementing a shift operation, etc. are omitted and are not shown in FIG. 4.

Provided next is the explanation about the principle for calculating the coefficients $b_0$ through $b_3$, which are included in the equation (5) and form the TAPINFO 1205.

In the PNG 1201 shown in FIG. 4, the M sequences $x^1 a_i$ to $x^3 a_i$, whose phases are respectively shifted by 1 to 3 bits from the output $a_i$ of the M sequence are the outputs themselves of the shift register stages SR1 through SR4 in the second to fourth stages, as shown in FIG. 5.

$$\text{the output } x^1 a_i: b_1 = 1, b_0 = b_2 = b_3 = 0 \quad (6)$$
$$\text{shifted by 1 bit}$$

$$\text{the output } x^2 a_i: b_2 = 1, b_0 = b_1 = b_3 = 0 \quad$$
$$\text{shifted by 2 bits}$$

$$\text{the output } x^3 a_i: b_3 = 1, b_0 = b_1 = b_2 = 0 \quad$$
$$\text{shifted by 3 bits}$$

Next, the M sequence $x^4 a_i$, whose phase is shifted by 4 bits from the output $a_i$ of the M sequence will be considered. In this case, if the primitive polynomial $f(x)=x^4+x+1$ is set $$f(x)=x^4+x+1=0 \quad (7)$$

the following equations are satisfied with the operation in the Galois field.

$$x^4=1+x \quad (8)$$

$$x^4 a_i = x^0 a_i + x^1 a_i \quad (9)$$

According to the above described equation (9), the M sequence $x^4 a_i$ whose phase is shifted by 4 bits from the output $a_i$ of the M sequence, is proved to be represented by the exclusive-OR operation performed between the output $a_i$ and the output $x^1 a_i$ whose phase is shifted by 1 bit. That is, the M sequence $x^4 a_i$ whose phase is shifted by 4 bits from the output $a_i$ can be obtained with the exclusive-OR operation performed between the output of the first shift register stage SR0 and that of the second shift register stage SR1, as shown in FIG. 6. Namely $$\text{the output } x^4 a_i: b_0 = b_1 = 1, b_2 = b_3 = 0 \quad (10)$$
$$\text{shifted by 4 bits}$$

Then, the M sequence $x^5 a_i$ whose phase is shifted by 5 bits from the output $a_i$ of the M sequence can be obtained with the exclusive-OR operation performed between the output of the second shift register stage SR1 and that of the third shift register stage SR2 according to following equation (11) obtained by multiplying both sides of the equation (9) by x, as shown in FIG. 6.

$$x^5 a_i = x^1 a_i + x^2 a_i \quad (11)$$

Namely, $$\text{the output } x^5 a_i: b_1 = b_2 = 1, b_0 = b_3 = 0 \quad (12)$$
$$\text{shifted by 5 bits}$$

Furthermore, the M sequence $x^6 a_i$ whose phase is shifted by 6 bits from the output $a_i$ of the M sequence can be obtained with the exclusive-OR operation performed between the output of the third shift register stage SR2 and that of the fourth shift register stage SR3 according to the following equation (13) obtained by multiplying both Asides of the equation (11) by x.

$$x^6 a_i = x^2 a_i + x^3 a_i \quad (13)$$

Namely, $$\text{the output } x^6 a_i: b_2 = b_3 = 1, b_0 = b_1 = 0 \quad (14)$$
$$\text{shifted by 6 bits}$$

The configuration shown in FIG. 7 is conventionally known as the configuration for sequentially outputting the coefficients $b_0$ through $b_3$, which form the TAPINFO 1205, according to the above described rules.

In this configuration, a 4-stage shift register (SR) 1501 is used in correspondence with the primitive polynomial $f(x)=x^4+x+1$, and an exclusive-OR circuit EXOR 1502 is inserted between the outside of the shift register stage $a_0$ and the input side of the shift register stage $a^1$, which respectively correspond to the terms $1=x^0$ and $x=x^1$ forming the right side of the equation (7). The output of the output stage $a_3$ of the shift register (corresponding to the term $x^4$ on the left side of the equation (7)) is fed back to the EXOR 1502. Since the stage preceding the shift register stage $a_0$ does not exist, the output of the output stage $a_3$ is directly fed back to the input side of the shift register stage $a_0$.

More typically, a shift register with the number of stages corresponding to the degree of the primitive polynomial $f(x)$ is used. Similar to the equation (7), an equation is formed by setting f(x) to "0" so that the term of the highest degree is included on the left side and the terms of other degrees are included on the right side. Then, an exclusive-OR circuit is inserted into the input side of thee shift register stage corresponding to each of the terms forming the right side of the formed equation, and the output (corresponding to each of the terms on the left side of the equation) of an output stage of the shift register is fed back to the exclusive-OR circuit.

Next, "1" is assigned to the first shift register stage $a_0$ as the initial value of the SR 1501, while "0" is assigned to the remaining shift register stages $a_1$ through $a_3$ shown in FIG. 7.

The shift operation is then performed the number of times which corresponds to a desired amount of phase shift, so that the respective coefficients $b_0$ through $b_3$ forming the TAPINFO 1205 shown in FIG. 4 are determined as the respective outputs of the stages $a_0$ through $a_3$ of the SR 1501.

With the conventional method shown in FIG. 7, however, the shift operation must be performed the number of times which corresponds to a desired amount of phase shift in order to calculate the TAPINFO 1205 corresponding to the desired amount of phase shift. Therefore, if the cycle of the M sequence becomes longer (for example, 10 minutes or so), it requires a huge amount of time to calculate the TAPINFO 1205.

SUMMARY OF THE INVENTION

The present invention was developed in the above described background, and aims at quick calculation of each piece of tap information corresponding to each amount of phase shift.

The present invention assumes the technique for calculating the respective phase shift coefficients $b_0$ through $b_{n-1}$ intended for obtaining the M sequence $x^d a_i$ whose phase is shifted by d bits from the output $a_i$ of the M sequence generated with a primitive polynomial f(x) of degree n, by using a linear combination $$b_0 x^0 a_i + b_1 x^1 a_i + b_2 x^2 a_i + \ldots + b_{n-1} x^{n-1} a_i$$

of the respective M sequences $x^0 a_i$ through $x^{n-1} a_i$ whose phases are shifted by 0 to n–1 bits from the output $a_i$.

In a first step of the present invention, the binary value of the amount of phase shift d is input.

In a second step, the n-bit vector value corresponding to a decimal value "1" is set as an initial input vector value.

In a third step, a target bit is set as the most significant bit of the binary value of the amount of phase shift d input in the first step.

In a fourth step, the vector; value of the primitive element $\alpha$ is multiplied with the input vector value within the Galois field GF $(2^n)$ and the result of the multiplication is defined as an output vector value if the value of the target bit is "1", and the input vector value is defined as the output vector value unchanged if the value of the target bit is "0".

In a fifth step, a square operation is performed for the output vector value obtained in the fourth step within the Galois field GF $(2^n)$.

In a sixth step, the position of the target bit is shifted to the least significant bit side by 1 bit in the binary value of the amount of phase shift d input in the first step, and the result of the square operation performed in the fifth step is used as a newly input vector value, with which the fourth and fifth steps are performed.

In a seventh step, the respective elements of the operation results obtained so far are output as the phase shift coefficients $b_0$ through $b_{n-1}$ when the fourth and fifth steps have been performed for all of the bits structuring the binary value of the amount of phase shift d input in the first step.

According to the present invention, phase shift coefficients can be calculated simply by repeatedly performing the operation for multiplying a current vector value with the vector representation value of the primitive element $\alpha$ and squaring the result of the vector multiplication, or the operation for squaring the unchanged current vector value, an approximate number of flog(d)/log(2)) times.

These two types of operations within the Galois field GF $(2^n)$ can be implemented by hardware of a compact size.

In this way, as the cycle of an M sequence becomes longer, the number of repetition times that the phase shift coefficients of the M sequence are calculated can be significantly reduced compared with that of the conventional method.

BRIEF DESCRIPTION OF THE DRAWINGS

One skilled in the art can easily understand additional objects and features of the present invention from the description of the preferred embodiments and the attached drawings. In the drawings:

FIG. 8 shows the table including the vector representation of the primitive element $\alpha$ of the Galois field GF $(2^4)$, which corresponds to the primitive polynomial $f(x)=x^4+x+1$, and its power;

FIG. 9 shows the principle of the operations according to the present invention;

DESCRIPTION OF THE PREFERRED EMBODIMENTS

Figure 1:
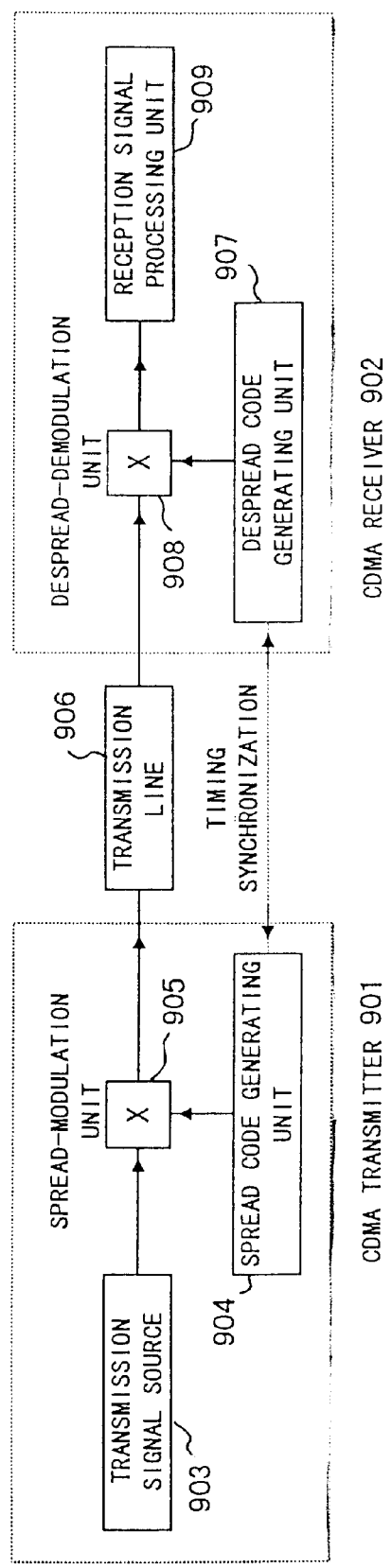
FIG. 1 shows one principle of the configuration of a CDMA communication system.
Figure 2:
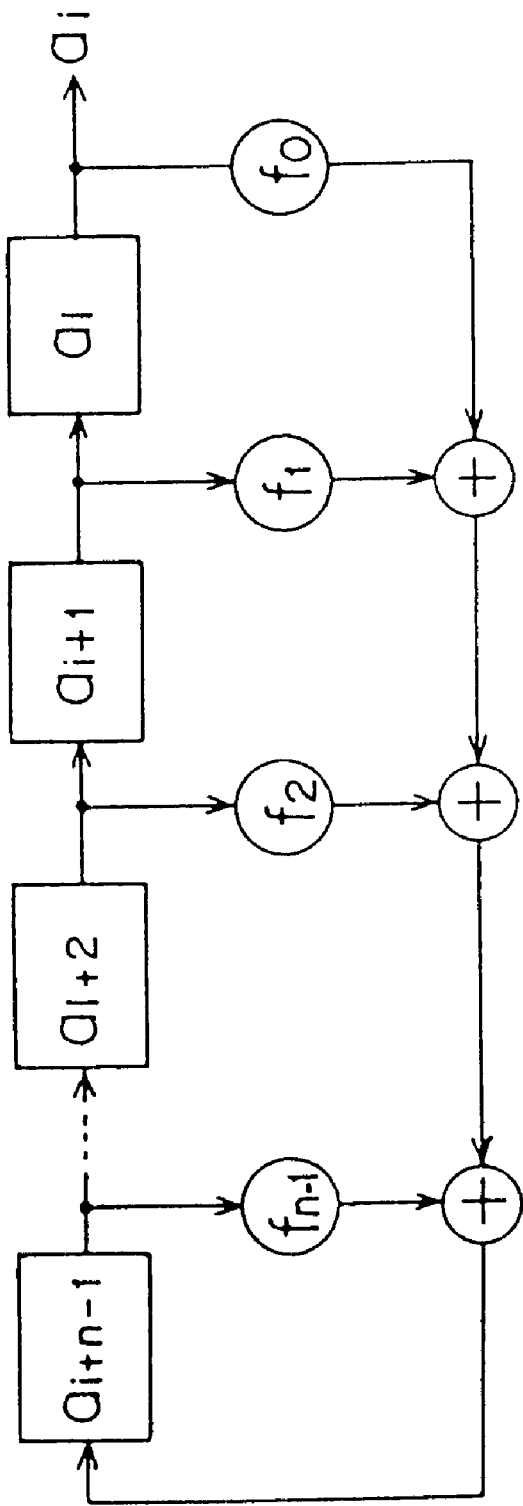
FIG. 2 shows the configuration of the circuit for generating an M sequence.
Figure 3:
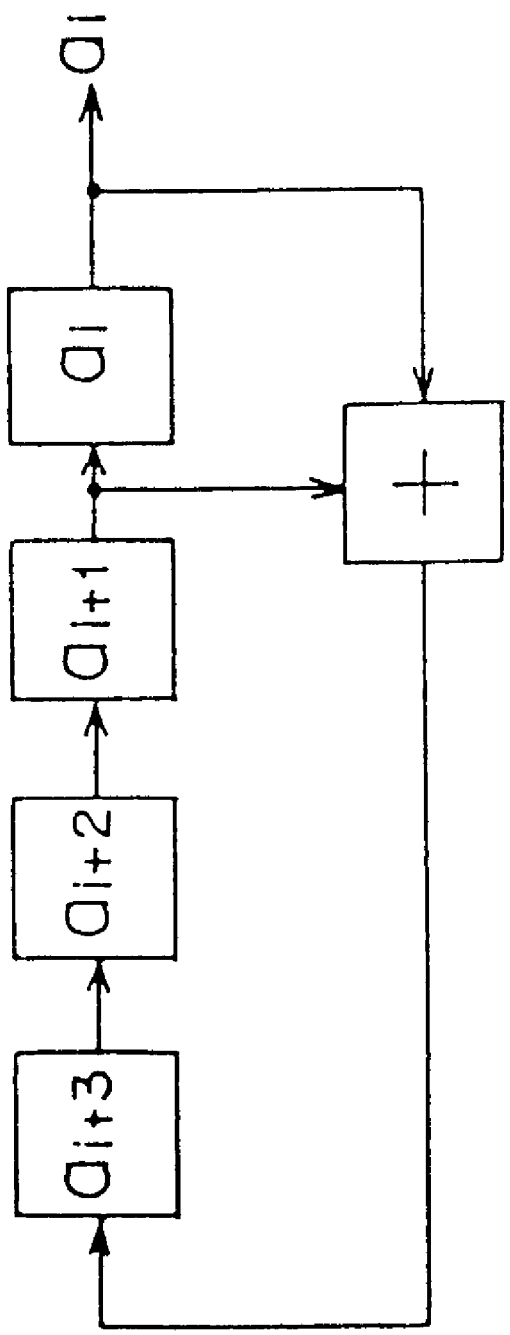
FIG. 3 shows the configuration of the circuit for generating/a 4-stage M sequence.

Hereinafter, the details of a preferred embodiment according to the present invention will be described by referring to the drawings.

<Principle of the Preferred Embodiment According to the Present Invention>

Provided first is the explanation about the principle of the preferred embodiment according to the present invention.

Figure 4:
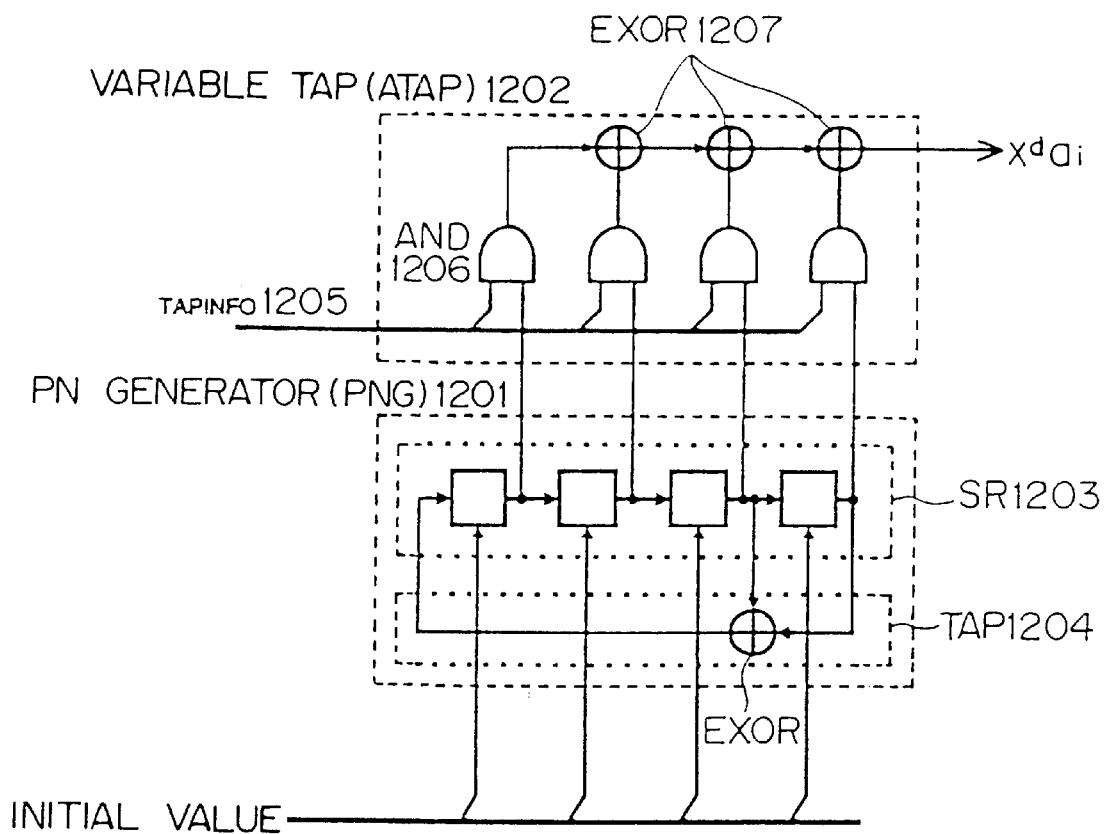
FIG. 4 shows the configuration of the circuit for generating an M sequence having an arbitrary phase.
Figure 5:
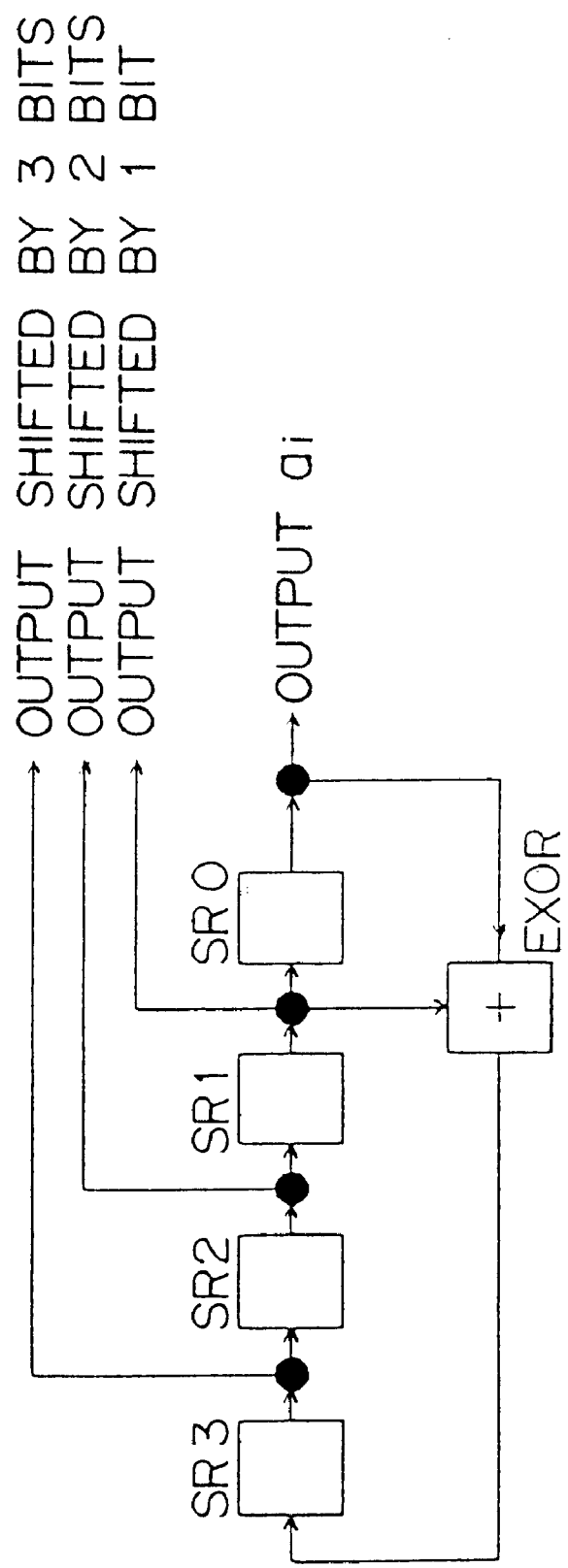
FIG. 5 is a configuration diagram for explaining the principle of the generation of an M sequence having an arbitrary phase (No. 1)
Figure 6:
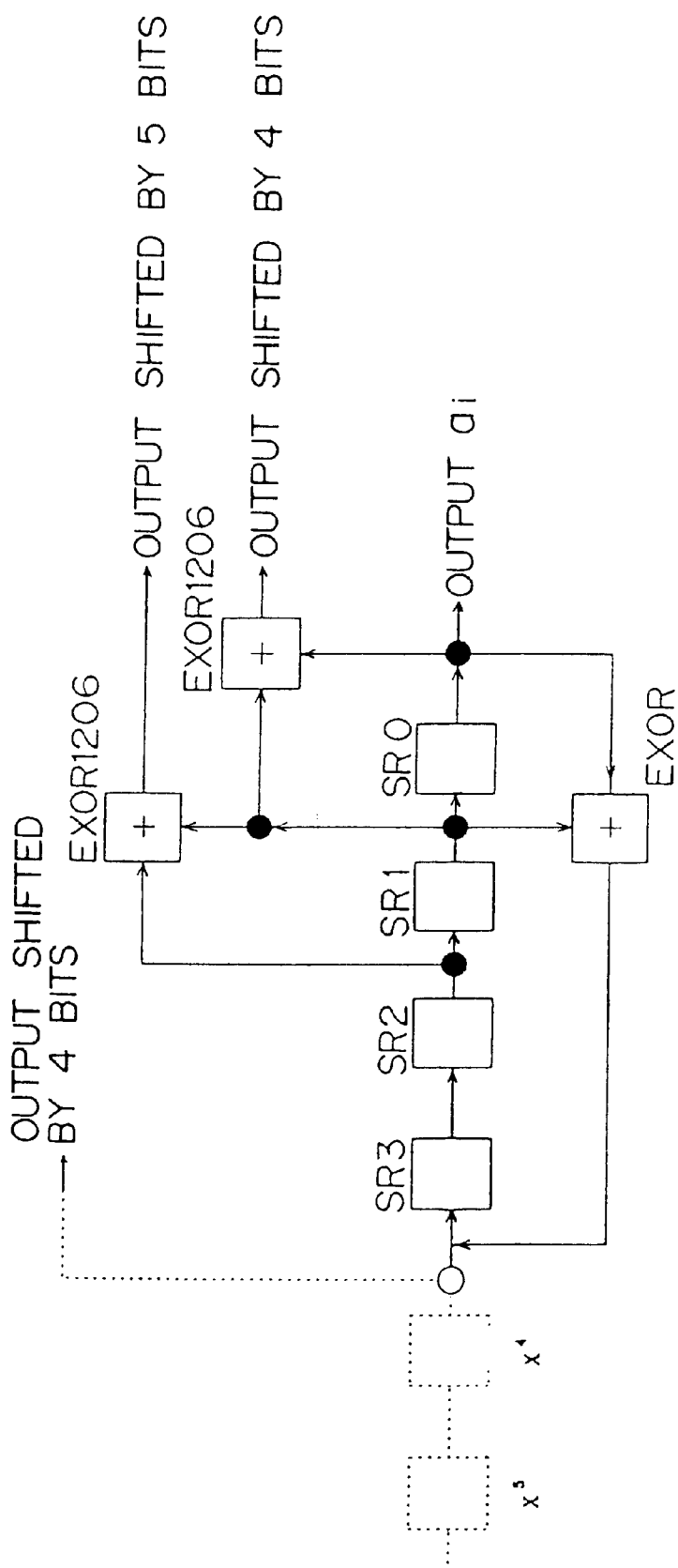
FIG. 6 is a configuration diagram for explaining the principle of the generation of an M sequence having an arbitrary phase (No. 2)
Figure 7:
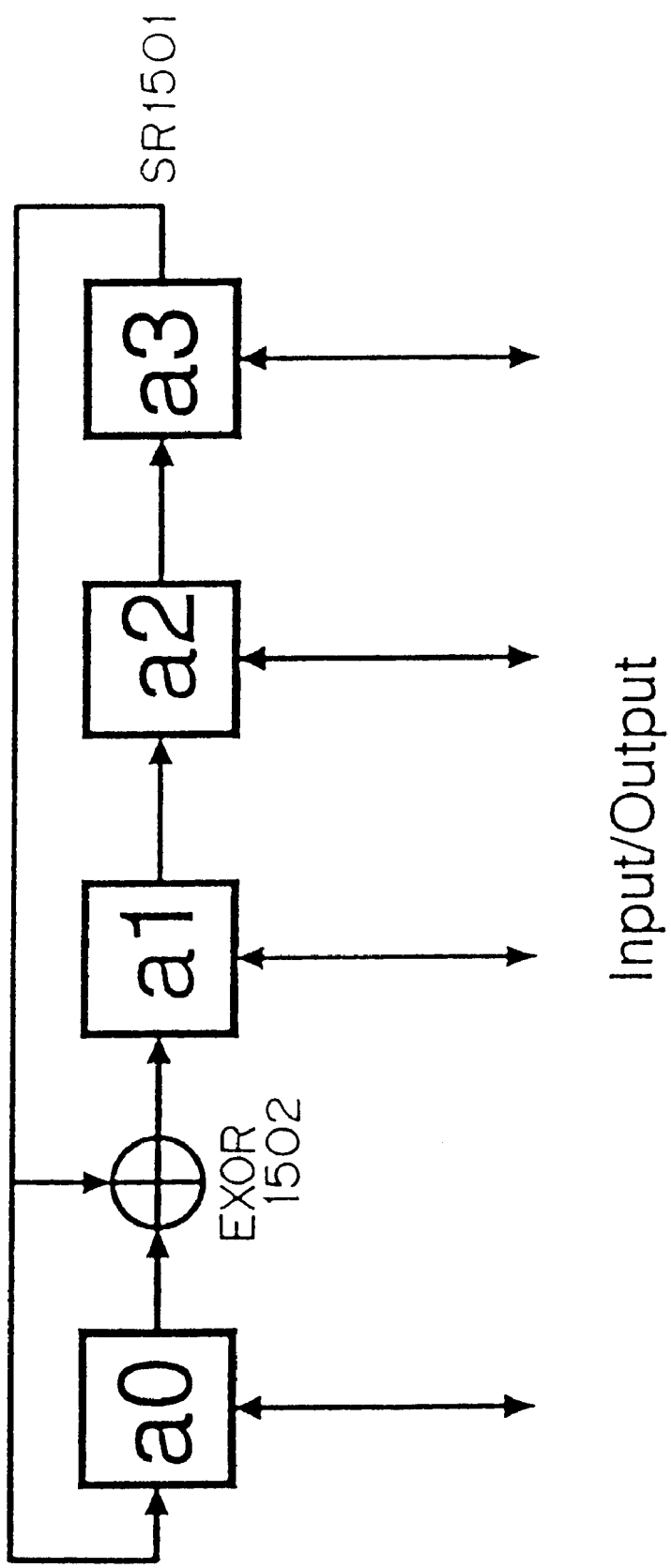
FIG. 7 is a configuration diagram showing the configuration of a conventional circuit for generating tap information TAPINFO in order to generate an M sequence having an arbitrary phase.

The preferred embodiment according to the present invention assumes the configuration shown in FIG. 4, which includes a 4-stage shift register (SR) 1203 and can generate an M sequence having an arbitrary phase, as an example.

Assume that the primitive element of the Galois field GF ($2^n$) is $\alpha$. In this case, each of the coefficients $b_0$ through $b_{n-1}$ included in the above described equation (5), which is the TAPINFO 1205 shown in FIG. 4, is equal to the value of each bit obtained by calculating $\alpha^d$ within the Galois field GF ($2^n$) for the n-bit vector which represents the primitive element $\alpha$.

FIG. 8 shows the vector representation of the primitive element $\alpha$ of the Galois field GF ($2^4$), which corresponds to the primitive polynomial f(x)=$x^4$+x+1, and the vector representation of the power of the primitive element $\alpha$. In this case, the vector representation of the primitive element $\alpha$ is (0(MSB), 0, 1, 0(LSB)) (a decimal value "2"). For example, the respective bit values of the vector representations $\alpha^1$ through $\alpha^6$ match the respective coefficient values $b_0$ through $b_3$ represented by the above described equations (6), (10), (12), and (14), which are used in the conventional method.

Here, $\alpha^d$ can be decomposed as represented by the following equation (15).

$$\alpha^d = \begin{cases} (\alpha^s)^2 & d: \text{even} \\ (\alpha^s)^2 \times \alpha & d: \text{odd} \end{cases} \quad s = d/2 \text{ (an integral part)} \quad (15)$$

By repeating the operation for replacing s with d in the term $\alpha^s$ obtained by the decomposition operation of the equation (15) and for further performing the decomposition operation of the equation (15), for example, $\alpha^6$ can be decomposed as follows.

$$\alpha^6 = (\alpha^3)^2 \quad (16)$$
$$= ((\alpha)^2 \times \alpha)^2$$
$$= (((\alpha^0)^2 \times \alpha)^2 \times \alpha)^2$$
$$= ((1^2 \times \alpha)^2 \times \alpha)^2$$

As a result, the vector representation value of $\alpha^d$ can be calculated only by repeatedly performing the operation for multiplying the current vector value with the vector representation value of $\alpha$ and squaring the vector multiplication result, or the operation for squaring the unchanged current vector value sequentially from the innermost term of the structure which is parenthesized and decomposed as the right side of the equation (16) within the Galois field GF ($2^n$) an approximate number of {log(d)/log(2)} times.

If the operation for multiplying the current vector value with the vector representation value of $\alpha$ and squaring the vector multiplication result or the operation for squaring the unchanged current vector value within the Galois field GF ($2^n$), can be implemented by hardware, it becomes possible to calculate the vector representation value of the element $\alpha^d$, that is, the above described coefficients $b^0$ through $b_{n-1}$, by the number of repetition times, which becomes much fewer than the conventionally required number of times d that the shift operation is performed, as the number of stages n is larger.

FIG. 9 shows the principle of the algorithm for identifying the above described repetition operation for calculating the coefficients $b_0$ through $b_{n-1}$ of the equation (5), which is the TAPINFO, 1205 shown in FIG. 4, if an arbitrary amount of phase shift d is provided.

Step 1:

First of all, the binary value of the amount of phase shift d is input. Assuming that the amount of phase shift d equals 6, the corresponding 4 bits binary value will become (0(MSB), 1, 1, 0(LSB)) as shown in FIG. 9(a).

Step 2:

The vector value of n bits (0(MSB), 0, 0, 1(LSB)) (a decimal value "1") is defined as an initial input vector value.

Step 3:

A target bit is defined as an MSB (Most Significant Bit) of the binary value of the amount of phase shift d input in Step 1.

Step 4:

If the target bit is "1", the input vector value is multiplied with the vector value of the primitive element $\alpha$ within the Galois field GF ($2^n$), and its result is used as an output vector value in Step 4 (operation I). For example, the vector value of the primitive element $\alpha$ of the Galois field GF ($2^4$), which corresponds to the primitive polynomial f(x)$x^4$+x+1, is (0(MSB), 0, 1, 0(LSB)), that is, a decimal value 2 as shown in FIG. 8. Accordingly, a 1-bit-shift operation is performed for the input vector value in this case.

If the target bit is "0", the input vector value is used as the output vector value in Step 2 as it is.

Step 5:

The output vector value in Step 4 is squared within the Galois field GF ($2^n$), and its operation result is used as the output vector value of Step 5 (operation II). Specifically, if an "i"th element $a_i$ ($0 \leq i \leq n-1$) of the output vector value of Step 4 is set, the element $a_i$ is cleared and "1" resulting from modulo 2 is added to an element $a_{2i}$ in modulo 2. The result of the addition is used as the output vector value of Step 5. Note that, however, if $2_i$ is equal to or larger than n, "1" resulting from modulo 2 is added to one or more elements $a_j$ which are equivalent to $\alpha^{2i}$ determined by the primitive polynomial f(x) within the Galois field GF ($2^n$), and the result of the addition is defined as the output vector value of Step 5.

Step 6:

The position of the target bit is shifted to the LSB side by 1 bit in the binary value of the amount of phase shift d input in Step 1, and the output vector value of Step 5 is used as a newly input vector value. Then. Steps 4 and 5 are again performed.

Upon termination of performing Steps 4 and 5 for the LSB, each element of the output vector value obtained in Step 5 is used as the TAPINFO 1205 shown in FIG. 4.

The algorithm used in Steps 1 through 6 is implemented by hardware, thereby quickly calculating the TAPINFO 1205 shown in FIG. 4 for an arbitrary amount of phase shift d.

FIG. 9(b) shows the procedure for performing the above described Steps 1 through 6 for 4 bits of phase shift (0(MSB), 1, 1, 0(LSB)), which corresponds to the amount of phase shift d=6 and is shown in FIG. 9(a).

FIG. 9(c) shows the results of the respective arithmetic operations shown in FIG. 9(b). The final operation result $\alpha^6=\alpha^3+\alpha^2$ in FIG. 9(c) matches the conventional operation result represented by the equation (13).

<The Detailed Configuration of the Preferred Embodiment According to the Present Invention>

Figure 10:
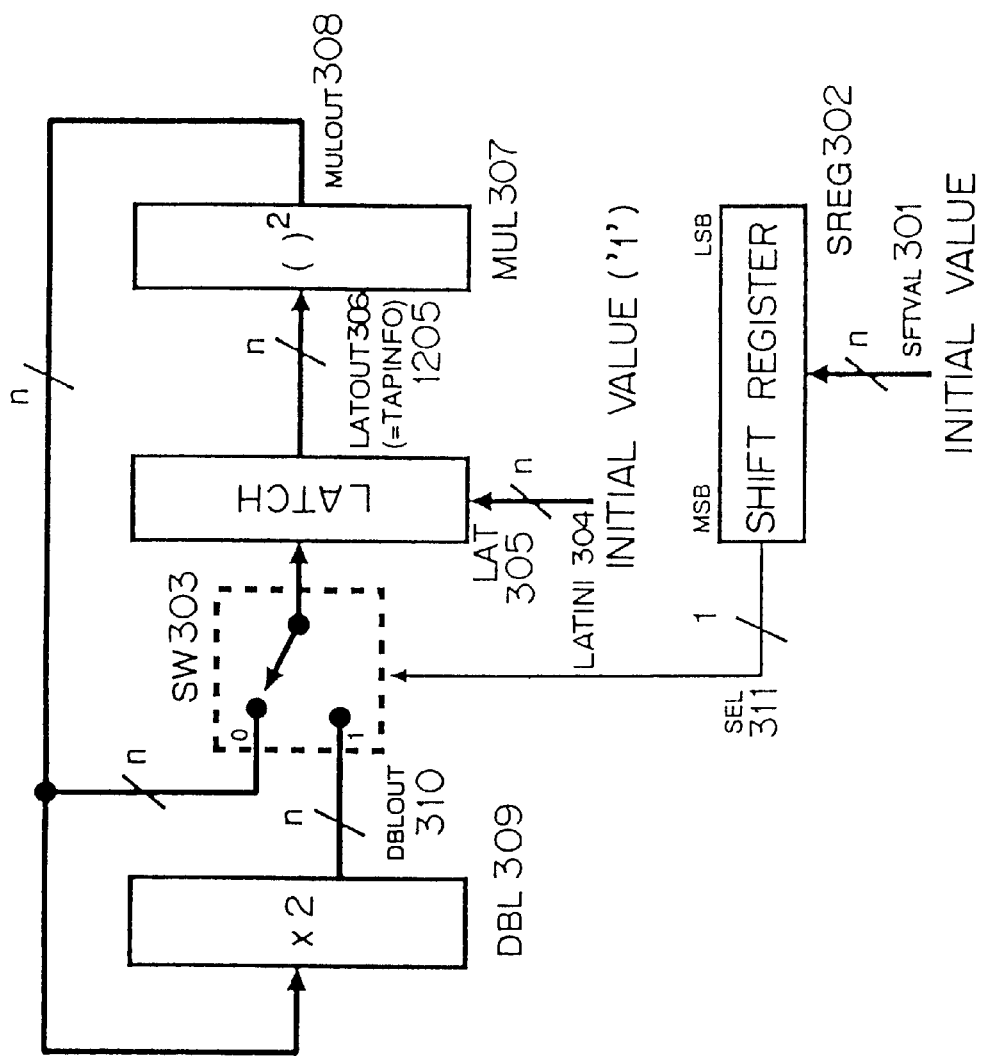
FIG. 10 shows the configuration of the circuit according to a preferred embodiment of the present invention.

FIG. 10 assumes the circuit shown in FIG. 4, which includes the 4-stage shift register (SR) 1203 and can generate an M sequence having an arbitrary phase. This figure shows the configuration of the circuit according to the preferred embodiment according of the present invention, which is intended for generating the TAPINFO 1205 shown in FIG. 4.

Figure 11:
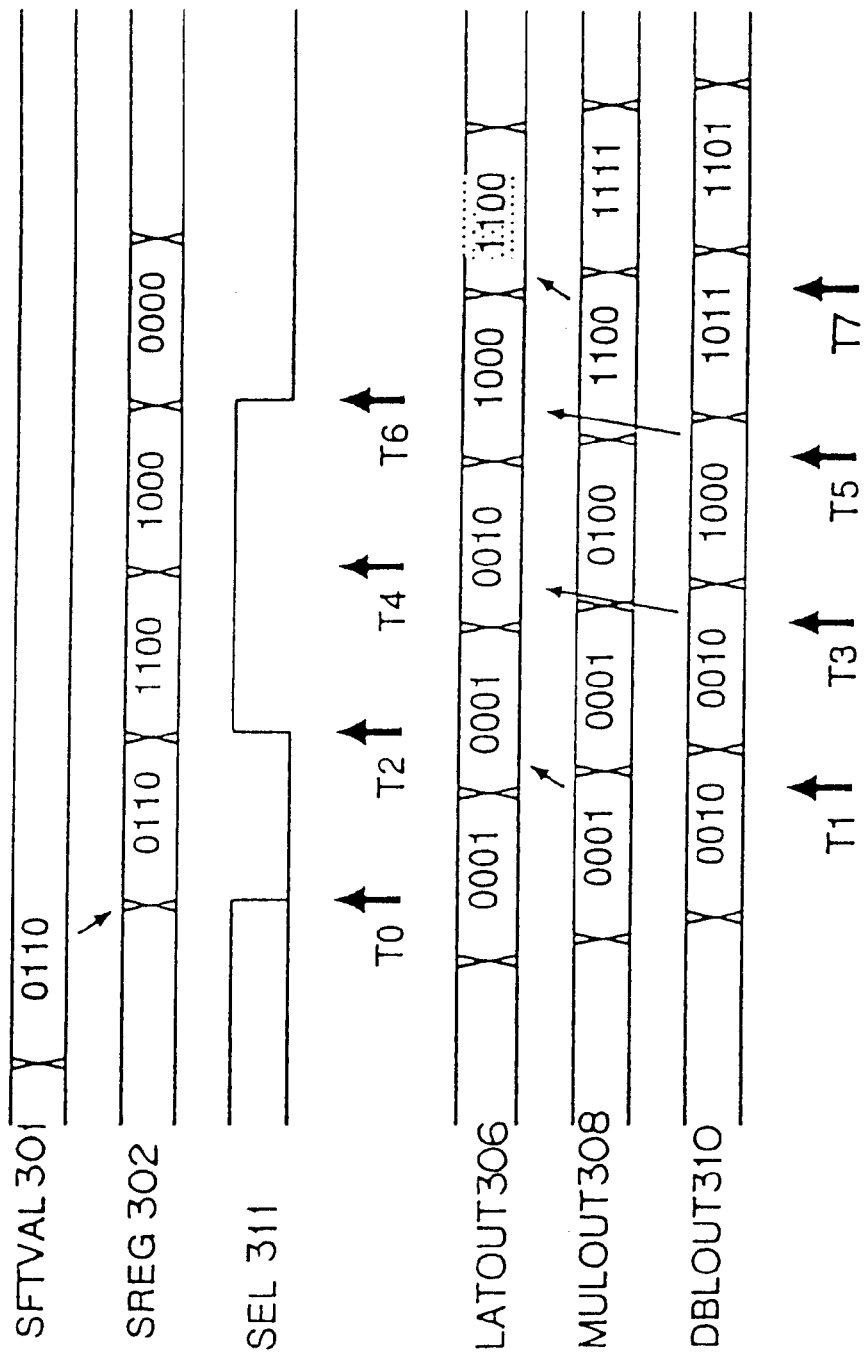
FIG. 11 is a timing chart showing the operations of the circuit according to the preferred embodiment of the present invention.

FIG. 11 is a timing chart showing the operations of the circuit shown in FIG. 10.

If the primitive polynomial is assumed to be $f(x)=x^4+x+1$, the signals such as the amount of phase shift (SFTVAL) 301, a latch output (LATOUT) 306, a square operation unit output (MULOUT) 308, and a double operation output (DBLOUT) 310, etc. will become the 4 bits vector signals.

The SFTVAL 301 is assigned to a shift amount register (SREG) 302 beforehand. This operation corresponds to Step 1 of the operational algorithm referred to in the above described principle of the preferred embodiment according to the present invention. In the example shown in FIG. 11, for example, the amount of phase shift d equals 6, and its 4-bit binary value (0(MSB), 1, 1, 0(LSB)) is assigned to the SREG 302.

Additionally, the 4-bit vector value (0(MSB), 0, 0, 1(LSB)) is assigned to a latch unit (LAT) 305 beforehand as an initial input vector value (LATINI) 304. This operation corresponds to Step 2 of the operational algorithm referred to in the above described principle of the preferred embodiment according to the present invention, As a result, the LATOUT 306 indicates the initial vector value (0(MSB), 0, 0, 1(LSB)) (a decimal value "1"). Accordingly, also the MULOUT 308 output from the square operation unit (MUL) 307 will become the same vector value.

Next, the fourth bit value (the value of the MSB) of the binary value (0(MSB), 1, 1, 0(LSB)) of the SFTVAL 301 is output from the SREG 302 to a switch (SW) 303 as a select control signal (SEL) 311 at timing T0 shown in FIG. 11. This operation corresponds to Step 3 of the operational algorithm referred to in the above described principle of the preferred embodiment according to the present invention.

The SW 303 selects the MULOUT 308 if the value of the SEL 311 is "0". The vector value (0(MSB), 0, 0, 1(LSB)) of the MULOUT 308, which is selected by the SW 303, is latched by the LAT 305 at timing T1 as shown in FIG. 11. This operation corresponds to the process performed when the target bit is "0" in Step 4 of the operational algorithm referred to in the above described principle of the preferred embodiment according to the present invention.

Consequently, the LATOUT 306 indicates the vector value (0(MSB), 0, 0, 1(LSB)) (a decimal value "1"). Accordingly, also the MULOUT 308 output from the MUL 307 will become the same vector value. This operation corresponds to Step 5 of the operational algorithm referred to in the above described principle of the preferred embodiment according to the present invention.

Next, the contents of the SREG 302 are shifted, and the third bit value "1" of the binary value (0(MSB), 1, 1, 0(LSB)) of the SFTVAL 301 is output from the SREG 302 to the SW 303 as the SEL 311 at timing T2 as shown in FIG. 11. This operation corresponds to Step 6 of the operational algorithm referred to in the above described principle of the preferred embodiment according to the present invention.

If the value of the SEL 311 is "1", the SW 303 selects the DBLOUT 310. Here, the double operation unit (DBL) 309 outputs the vector value (0(MSB)), 0, 1, 0(LSB)) as the DBLOUT 310 by performing the 1-bit-left shift operation for the vector value (0(MSB), 0, 0, 1(LSB)) of the MULOUT 308. Then, the above described vector value of the DBLOUT 310, which is selected by the SW 303, is latched by the LAT 305 at timing T3 as shown in FIG. 11. This operation corresponds to the process performed when the value of the target bit is "1" in Step 4 of the operational algorithm referred to in the above described principle of the preferred embodiment according to the present invention.

As a result, the LATOUT 306 indicates the vector value (0(MSB), 0, 1, 0(LSB)). Accordingly, the MULOUT 308 output from the MUL 307 indicates the vector value (0(MSB), 1, 0, 0(LSB)). This operation corresponds to Step 5 of the operational algorithm referred to in the above described principle of the preferred embodiment according to the present invention.

Next, the contents of the SREG 302 are shifted, and the second bit value "1" of the binary value (0(MSB), 1, 1, 0(LSB)) of the SFTVAL 301 is output from the SREG 302 to the SW 303 as the SEL 311 at timing T4 as shown in FIG. 11. This operation corresponds to Step 6 of the operational algorithm referred to in the above described principle of the preferred embodiment according to the present invention.

If the value of the SEL 311 is "1", the SW 303 selects the DBLOUT 310. Here, the double operation unit (DBL) 309 outputs the vector value (1(MSB), 0, 0, 0(LSB)) as the DBLOUT 310 by performing a 1-bit-left shift operation for the vector value (0(MSB), 1, 0, 0(LSB)) of the MULOUT 308. Then, the above described vector value of the DBLOUT 310, which is selected by the SW 303, is latched by the LAT 305 at timing T5. This operation corresponds to the process performed when the target bit is "1" in Step 4 of the operational algorithm referred to in the above described principle of the preferred embodiment according to the present invention.

Consequently, the LATOUT 306 indicates the vector value (1(MSB), 0, 0, 0(LSB)). Accordingly, the MULOUT 308 output from the MUL 307 indicates the vector value (1(MSB), 1, 0, 0(LSB)). This operation corresponds to Step 5 of the operational algorithm referred to in the above described principle of the preferred embodiment according to the present invention.

Then, the contents of the SREG 302 are shifted, and the first bit (LSB) value "0" of the binary value (0(MSB), 1, 1, 0(LSB)) of the SFTVAL 301 is output from the SREG 302 to the SW 303 as the SEL 311 at timing T6 as shown in FIG. 11. This operation corresponds to Step 6 of the operational algorithm referred to in the above described principle of the preferred embodiment according to the present invention.

If the value of the SEL 311 is "0", the SW 303 selects the vector value (1(MSB), 1, 0, 0(LSB)) of the MULOUT 308. Then, the above described vector value of the MULOUT 308, which is selected by the SW 303, is latched by the LAT 305 at timing T7 as shown in FIG. 11. This operation corresponds to the process performed when the target bit is "0" in Step 4 of the operational algorithm referred to in the above described principle of the preferred embodiment according to the present invention.

As a result, the LATOUT 306 indicates the vector value (1(MSB), 1, 0, 0(LSB)). Then, the vector value (1(MSB), 1, 0, 0(LSB)) of the LATOUT 306 is obtained as the TAPINFO 1205 shown in FIG. 4, which corresponds to the amount of phase shift d equal to 6, in synchronization with the termination of the eighth timing, that is, the timing T7.

This vector value matches the result of the operation $\alpha^6=\alpha^3+\alpha^2$ shown in FIG. 9(c), or the result of the conventional operation represented by the equation (13).

<The First Configuration of the MUL 307 According to the Preferred Embodiment of the Present Invention>

Figure 12:
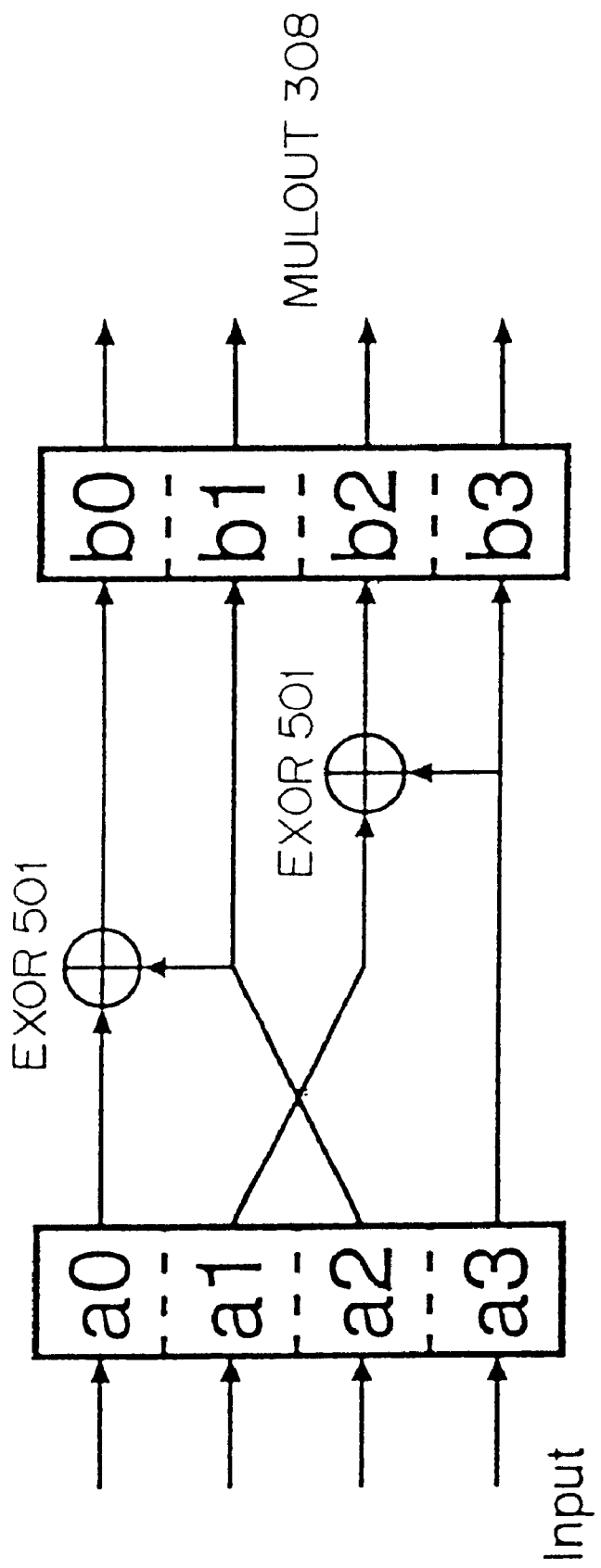
FIG. 12 shows the first configuration of a square operation unit (MUL)

FIG. 12 shows the first configuration of the MUL 307 shown in FIG. 10.

This configuration implements the following connections between the input signal lines $a_0$ through $a_3$ (the LATOUT 306 shown in FIG. 10) and the output signal lines $b_0$ through $b_3$ (the MULOUT 308 shown in FIG. 10).

(1) Normally, if $i \leq [n/2]$ (note that [x] is an integer which does not exceed x) for an input signal line $a_i$ ($0 \leq i \leq n-1$), the input signal line $a_i$ is connected to an output signal line $b_{2i}$. Specifically, the input signal line $a_0$ is connected to the output signal line $b_0$ via one of exclusive-OR circuits (EXORs) 501, while the input signal line $a_1$ is connected to the output signal line $b_2$ via an EXOR 501.

(2) Normally, if $i > [n/2]$ for the input signal line $a_i$ ($0 \leq i \leq n-1$), the input signal line $a_i$ is connected to one or more signal output lines $b_j$ (note that $0 \leq j \leq n-1$), which are equivalent to $\alpha^{2i}$ determined by the primitive polynomial $f(x) = x^4 + x + 1$ within the Galois field GF ($2^n$). Specifically, the input signal line $a_2$ is connected to the output signal line $b_0$ via the output signal line $b_1$ and the EXOR 501, while the input signal line $a_3$ is connected to the output signal line $b_2$ via the output signal line $b_3$ and an EXOR 501.

If a plurality of input signal lines are connected to one output signal line as described above, the plurality of input signal lines are connected to the one output signal line via an EXOR 501.

With the above described configuration, the MUL 307 for performing the square operation within the Galois field GF ($2^n$) can be implemented as the hardware running with 1 clock.

<The Second Configuration of the MUL 307 According to the Preferred Embodiment of the Present Invention>

Figure 13:
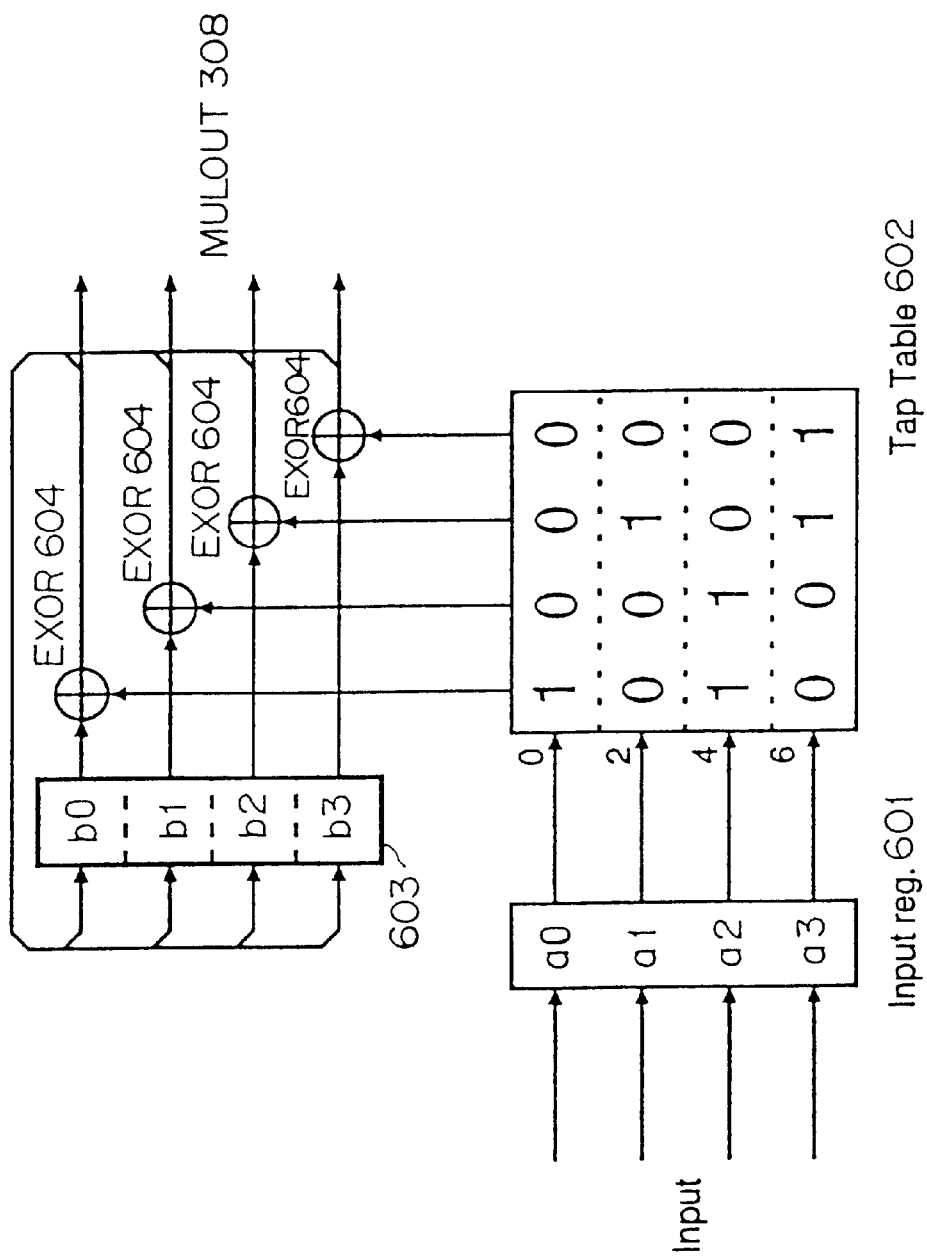
FIG. 13 shows the second configuration of the square operation unit (MUL)

FIG. 13 shows the second configuration of the MUL 307 shown in FIG. 10.

This configuration comprises an input register 601 for holding the respective signal values of input signal lines $a_0$ through $a_{n-1}$ (n=4 in FIG. 13); a tap table 602 for storing the coefficient value indicating each of the operation values $\alpha^0$, $\alpha^2$, ..., $\alpha^{2n}$, which corresponds to the primitive element $\alpha$ within the Galois field GF ($2^n$); a latch 603 for holding the respective n-bit signal values $b_0$ through $b_{n-1}$; and n exclusive-OR circuits (EXORs) 604 for performing an exclusive-OR operation between each output value of the latch 603 and that of the tap table 602, and for feeding back the result of the operation to the input side of the latch 603.

When operations are started, the entire contents of the latch 603 are reset to 0.

Next, the following operations are repeatedly performed sequentially from the value of the input signal line $a_0$ to that of the signal line $a_{n-1}$ among the values of the input signal lines $a_0$ through $a_{n-1}$ (the LATOUT 306 shown in FIG. 10), which are assigned to the input register 601.

(1) The coefficient value group stored in the tap table 602, which corresponds to the value of the input signal line $a_i$ currently being processed, is read out, and the respective coefficient values are input to the respective n EXORs 604. The respective outputs of the latch 603 are also input to the respective EXORs 604.

(2) The respective outputs of the EXORs 604 are fed back to the respective inputs of the latch 603.

(3) The next input signal line $a_{i+1}$ is selected, and the operations of the above described (1) and (2) are again performed.

(4) Upon termination of the operations of (1) and (2) for the input signal line $a_{n-1}$, the outputs of the respective EXORs 604 are output as the output signals $b_0$ through $b_3$ (the MULOUT 308 shown in FIG. 10).

With the above described configuration, the MUL 307 which performs the square operation within the Galois field GF ($2^n$) shown in FIG. 10 can be implemented as the hardware running with a maximum of n clocks.

<The First Configuration of the DBL 309 According to the Preferred Embodiment of the Present Invention>

Figure 14:
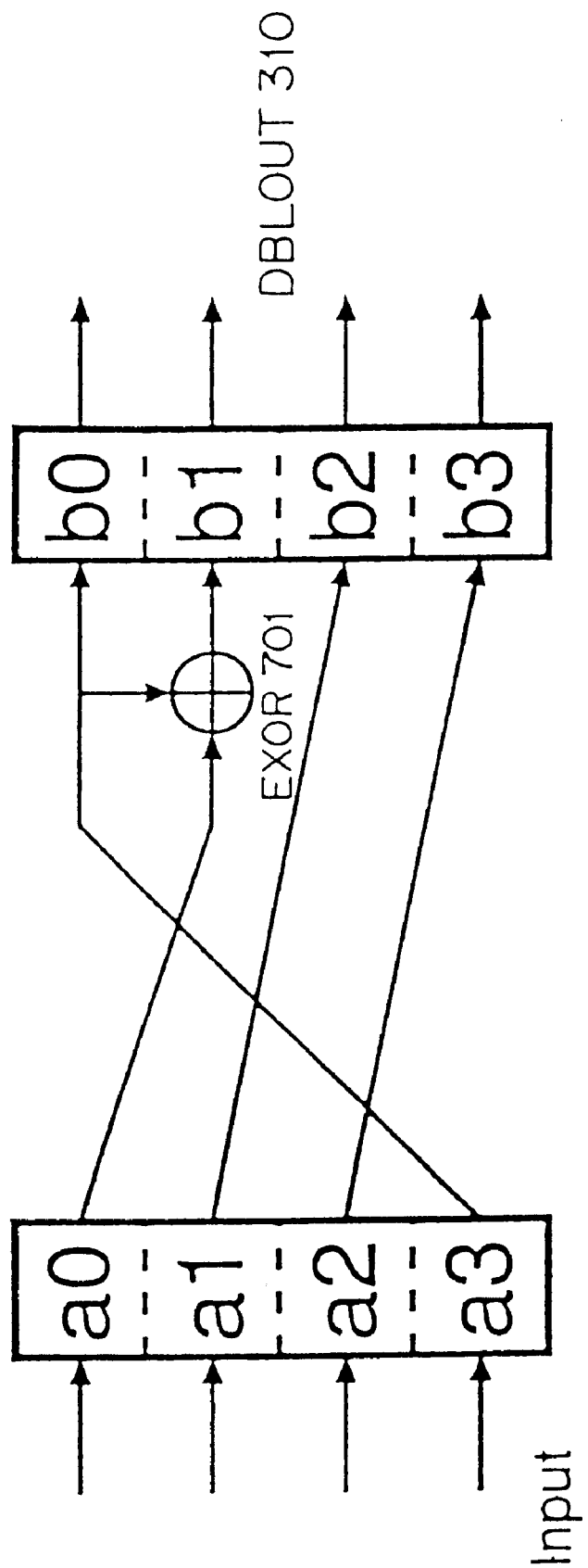
FIG. 14 shows the first configuration of a double operation unit (DBL)

FIG. 14 shows the first configuration of the DBL 309 shown in FIG. 10. This configuration implements the following connections between the input signal lines $a_0$ through $a_3$ (the MULOUT 308 shown in FIG. 10) and the output signal lines $b_0$ through $b_3$ (the DBLOUT 310 shown in FIG. 10).

(1) Normally, if $i < n-1$ for an input signal line $a_i$ ($0 \leq i \leq n-1$), the input signal line $a_i$ is connected to an output signal line $b_{i+1}$. Specifically, the input signal lines $a_0$, $a_1$, $a_2$ are respectively connected to the output signal lines $b_1$, $b_2$, $b_3$.

(2) Normally, if $i = n-1$ for the input signal line $a_i$ ($0 \leq i \leq n-1$), the input signal line antis connected to one or more output signal lines $b_j$ determined by the primitive polynomial $f(x) = x^4 + x + 1$ within the Galois field GF ($2^n$). Specifically, the input signal line $a_3$ is connected to the output signal line b, via an EXOR 701 and the output signal line $b_0$.

If a plurality of input signal lines are connected to one output signal line as described above, the plurality of input signal lines are connected to the output signal line via the EXOR 701 as described above.

With the above described configuration, the DBL 309 for performing the double operation: within the Galois field GF ($2^n$) shown in FIG. 10 can be implemented as the hardware running with one clock.

<The Second Configuration of the DBL 309 According to the Preferred Embodiment of the Present Invention>

Figure 15:
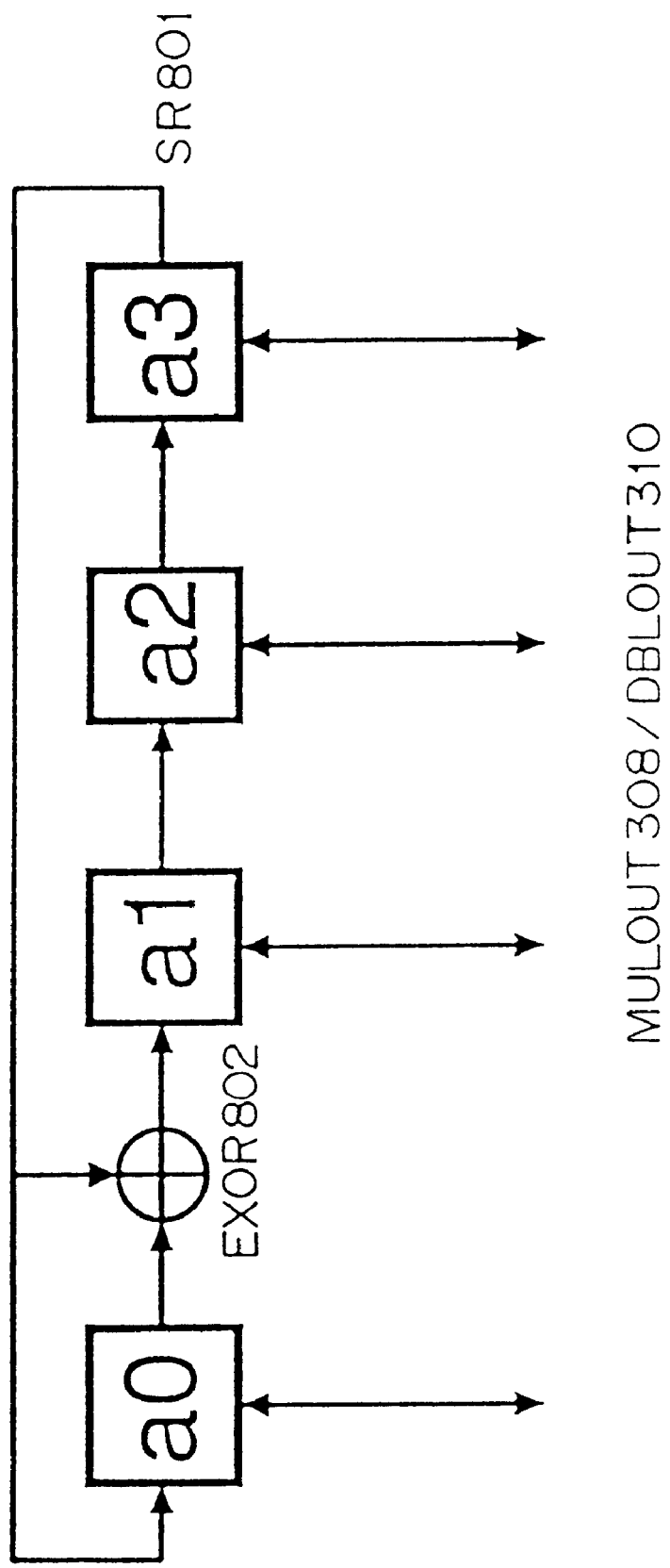
FIG. 15 shows the second configuration of the double operation unit (DBL).

FIG. 15 shows the second configuration of the DBL 309 shown in FIG. 10.

This configuration comprises one or more exclusive-OR circuits (EXORs) 802, each of which performs an exclusive-OR operation between the outputs of one or more predetermined stages, which correspond to the positions of one or more coefficients equivalent to an determined by the primitive polynomial $f(x) = x^4 + x + 1$ within the Galois field GF ($2^n$), and the output of the last stage of the SR 801, and for outputting each operation result to the stage next to each predetermined stage as each input signal, in addition to the n-stage (n=4 in FIG. 15) shift register SR 801. In the example shown in FIG. 15, an EXOR 802 is inserted between the first and second stages $a_0$ and $a_1$ of the SR 801.

On starting operation, an input signal (the MULOUT 308 shown in FIG. 10) is input to each of the stages of the SR 801, and the content of each of the stages of the SR 801 is output as an output signal (the DBLOUT 310 shown in FIG. 10) after the shift operation is performed for one stage.

With the above described configuration, the DBL 309 for performing a double operation within the Galois field GF ($2^n$) shown in FIG. 10 can be implemented as the hardware running with one clock.

What is claimed is:

1. An M sequence phase shift coefficient calculating method for calculating respective phase shift coefficients $b_0$ through $b_{n-1}$ intended for obtaining an M sequence $x^d a_i$ whose phase is shifted by d bits from an output $a_i$ of an M sequence generated by a primitive polynomial f(x) of n degrees by using a linear combination of respective M sequences $x^0 a_i$ through $x^{n-1} a_i$, whose phases are shifted by 0 to n-1 bits from the output $a_i$, comprising:

a first step of inputting a binary value of an amount of phase shift d;

a second step of setting an n-bit vector value, which corresponds to a decimal value "1", as an initial input vector value;

a third step of setting a target bit as a most significant bit of a binary value of the amount of phase shift d input in said first step;

a fourth step of multiplying an input vector value with a vector value of a primitive element α within a Galois field GF ($2^n$) and using a multiplication result as an output vector value if the target bit is "1", and of defining the input vector value as an unchanged output vector value if the target bit is "0";

a fifth step of performing a square operation within the Galois field GF ($2^n$) for the output vector value obtained in said fourth step;

a sixth step of shifting a position of the target bit to a least significant bit side by 1 bit in the binary value of the amount of phase shift d, which is input in said first step, and of performing said fourth and fifth steps by using a result of the square operation performed in said fifth step as a newly input vector value; and a seventh step of outputting respective elements of operation results which are obtained so far as the respective phase shift coefficients $b_0$ through $b_{n-1}$, when said fourth and fifth steps has been performed for all of bits structuring the binary value of the amount of phase shift d input in said first step.

2. An M sequence phase shift coefficient calculating device for calculating respective phase shift coefficients $b_0$ through $b_{n-1}$ intended for obtaining an M sequence $x^d a_i$ whose phases is shifted by d bits from an output $a_i$ of an M sequence generated by a primitive polynomial f(x) of n degrees by using a linear combination of respective M sequences $x^0 a_i$ through $x^{n-1} a_i$, whose phases are shifted by 0 to n−1 bits from the output $a_i$, comprising:

an n-stage shift register circuits to which an n-bit binary value corresponding to an amount of phase shift d is assigned, for performing a shift operation in synchronization with a clock, and outputting a most significant bit side output as a switch control signal;

a latch circuit, to which an n-bit vector value corresponding to a decimal value "1" is assigned as an initial vector value, for thereafter sequentially holding an n-bit input in synchronization with the clock;

a square operation circuit for performing a square operation within a Galois field GF ($2^n$) for an n-bit output of said latch circuit;

a double operation circuit for performing a double operation within the Galois field GF ($2^n$) for an n-bit output of said square operation circuit; and a switch circuit for selecting either of the n-bit output of said square operation circuit and the n-bit output of said double operation circuit according to the switch control signal, and for outputting a selected output to said latch circuit, wherein the n-bit output of said latch circuit is output, as the respective phase shift coefficients $b_0$ through $b_{n-1}$ after a shift operation and a latch operation are performed a number of times n.

3. The M sequence phase shift coefficient calculating device according to claim 2, wherein said square operation circuit is configured so that: between n-bit input signal lines $a_0$ through $a_{n-1}$ and n-bit output signal lines $b_0$ through $b_{n-1}$, an input signal line $a_i$ is connected to an output signal line $b_{2i}$ if i is equal to or smaller than a maximum integer which does not exceed n/2; the input signal line $a_i$ is connected to one or more output signal lines $b_j$ ($0 \leq j \leq n-1$), which are equivalent to a value $\alpha^{2i}$ determined by a primitive polynomial f(x) possessed by a primitive element α within the Galois field GF ($2^n$) if i is larger than the maximum integer which does not exceed n/2; and a plurality of input signal lines are connected to a single output signal line via an exclusive-OR circuit if the plurality of input signal lines are connected to the single output signal line.

4. The M sequence phase shift coefficient calculating device according to claim 2, wherein said square operation circuit comprises:

an input register circuit for holding respective values of n-bit input signal lines;

a tap table storing circuit for storing coefficient values indicating respective operation values $\alpha^0, \alpha^2, \ldots, \alpha^{2n}$, which are determined by the primitive polynomial f(x) possessed by a primitive element α within the Galois field GF ($2^n$);

a latch circuit for holding respective signal values of n bits; and n exclusive-OR circuits, each of which performs an exclusive-OR operation between each output value of said latch circuit and each output value of said tap table storing circuit, and feeds back each operation result to an input side of said latch circuit, wherein:

after entire contents of said latch circuit are reset to "0" when operations are activated, a coefficient value group stored in said tap table storing circuit, which corresponds to signal values of input signal lines currently being processed, is read out;

respective coefficient values are input to said n exclusive-OR circuits; and an operation for making said latch circuit perform the latch operation is sequentially and repeatedly performed for respective signal values of input signal lines, which are held in said input register circuit, starting from a signal value of an input signal line of a least significant bit to a signal value of an input signal line of a most significant bit.

5. The M sequence phase shift coefficient calculating device according to claim 2, wherein said double operation circuit is configured so that: between n-bit input signal lines $a_0$ through $a_{n-1}$ and output signal lines $b_0$ through $b_{n-1}$, an input signal line at is connected to an output signal line $b_{i+1}$ if i is smaller than n−1; the input signal line $a_i$ is connected to one or more output signal lines $b_j$ ($0 \leq j \leq n-1$) equivalent to a value $\alpha^n$ determined by a primitive polynomial f(x) possessed by a primitive element α within the Galois field GF ($2^n$) if i equals n−1; and a plurality of input signal lines are connected to a single output signal line $b_j$ ($0 \leq j \leq n-1$) via an exclusive-OR circuit if the plurality of input signal lines are connected to the single output signal line.

6. The M sequence phase shift coefficient calculating device according to claim 2, wherein said double operation circuit comprises:

an n-stage shift register circuit; and one or more exclusive-OR circuits for performing an exclusive-OR operation between outputs of one or more predetermined stages of said shift register circuit, which correspond to positions of one or more coefficients equivalent to a value $\alpha^n$ determined by a primitive polynomial f(x) possessed by a primitive element α within the Galois field GF ($2^n$), and an output of a last stage of said shift register circuit, and for outputting each operation result as each input signal to a stage next to each of the predetermined stages, wherein when operations are started, an n-bit input signal is input to the respective stages of said shift register circuit, and contents of the respective stages of said shift register circuit are output as an n-bit output signal.

* * * * *